United States Patent [19]
Harris et al.

[11] 3,924,999
[45] Dec. 9, 1975

[54] BELL END OF BELL AND SPIGOT JOINT AND METHOD AND ASSEMBLY

[75] Inventors: Allan Harris, Santa Ana; Lemuel Hampton Huff, Paramount, both of Calif.

[73] Assignee: Johns-Manville Corporation, Denver, Colo.

[22] Filed: July 18, 1974

[21] Appl. No.: 489,624

Related U.S. Application Data

[63] Continuation-in-part of Ser. No. 408,771, Oct. 23, 1973, abandoned.

[52] U.S. Cl............................ 425/392; 425/DIG. 218
[51] Int. Cl.² ............................................ B29C 1/00
[58] Field of Search.................... 264/249, 296, 322; 425/384, 388, 392, 324, 340, 342, DIG. 218, 393; 29/423, 450

[56] References Cited
UNITED STATES PATENTS
3,836,622  9/1974  Sporre ............................... 264/249

*Primary Examiner*—Francis S. Husar
*Assistant Examiner*—Robert J. Charvat
*Attorney, Agent, or Firm*—Robert M. Krone; Stephen C. Shear

[57]  ABSTRACT

The bell end of a bell and spigot pipe is disclosed herein and includes an inner-circumferential groove within which a circumferential sealing gasket is located. The groove has a particular configuration which provides resistance to gasket displacement during assembly of a bell and spigot joint. In a preferred configuration, the gasket is locked in the groove. This is accomplished, as disclosed herein, by initially forming the groove around a sealing gasket and core section. Thereafter, the groove configuration is altered to provide increased resistance to gasket displacement, preferably to lock the gasket within the groove.

5 Claims, 14 Drawing Figures

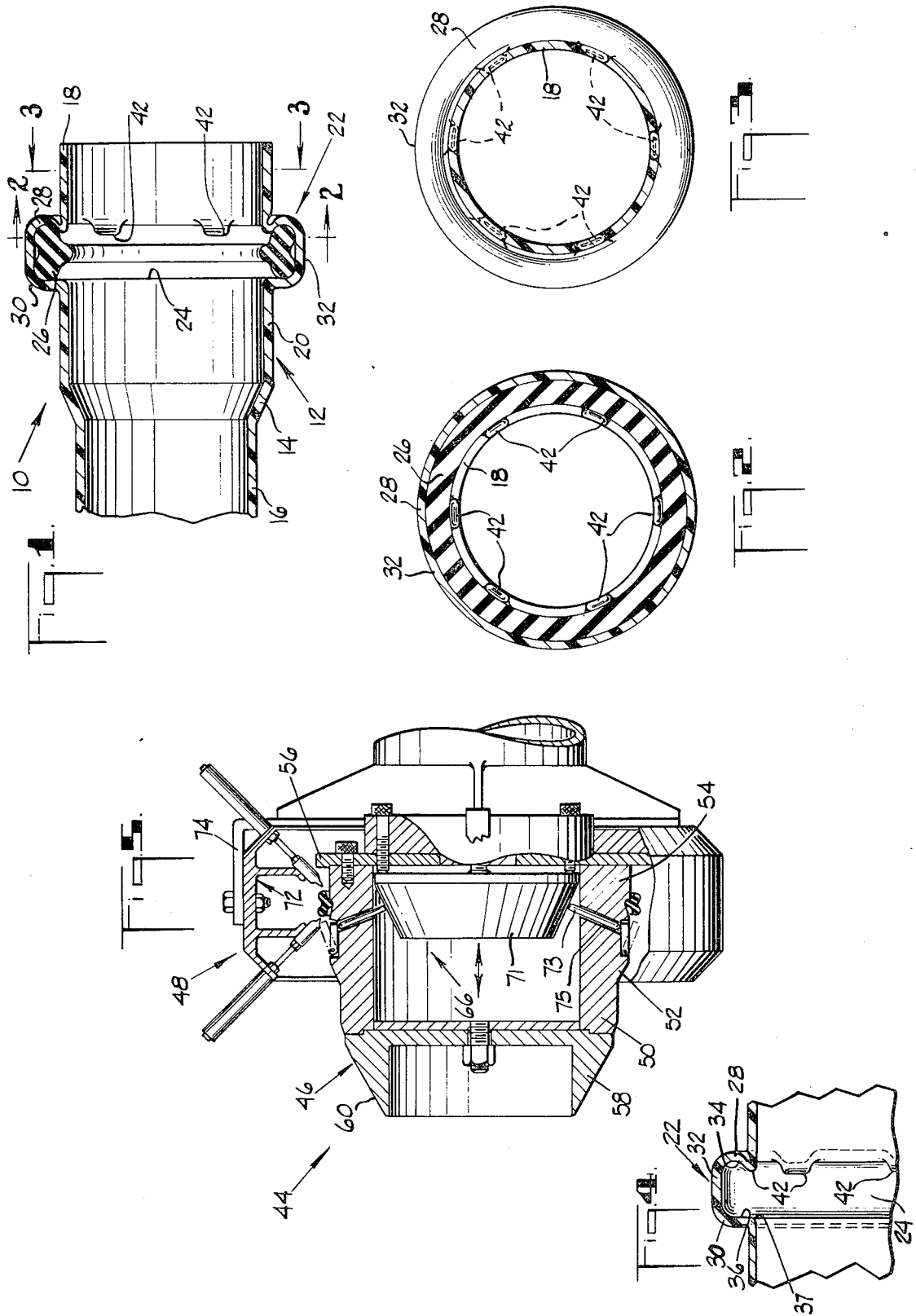

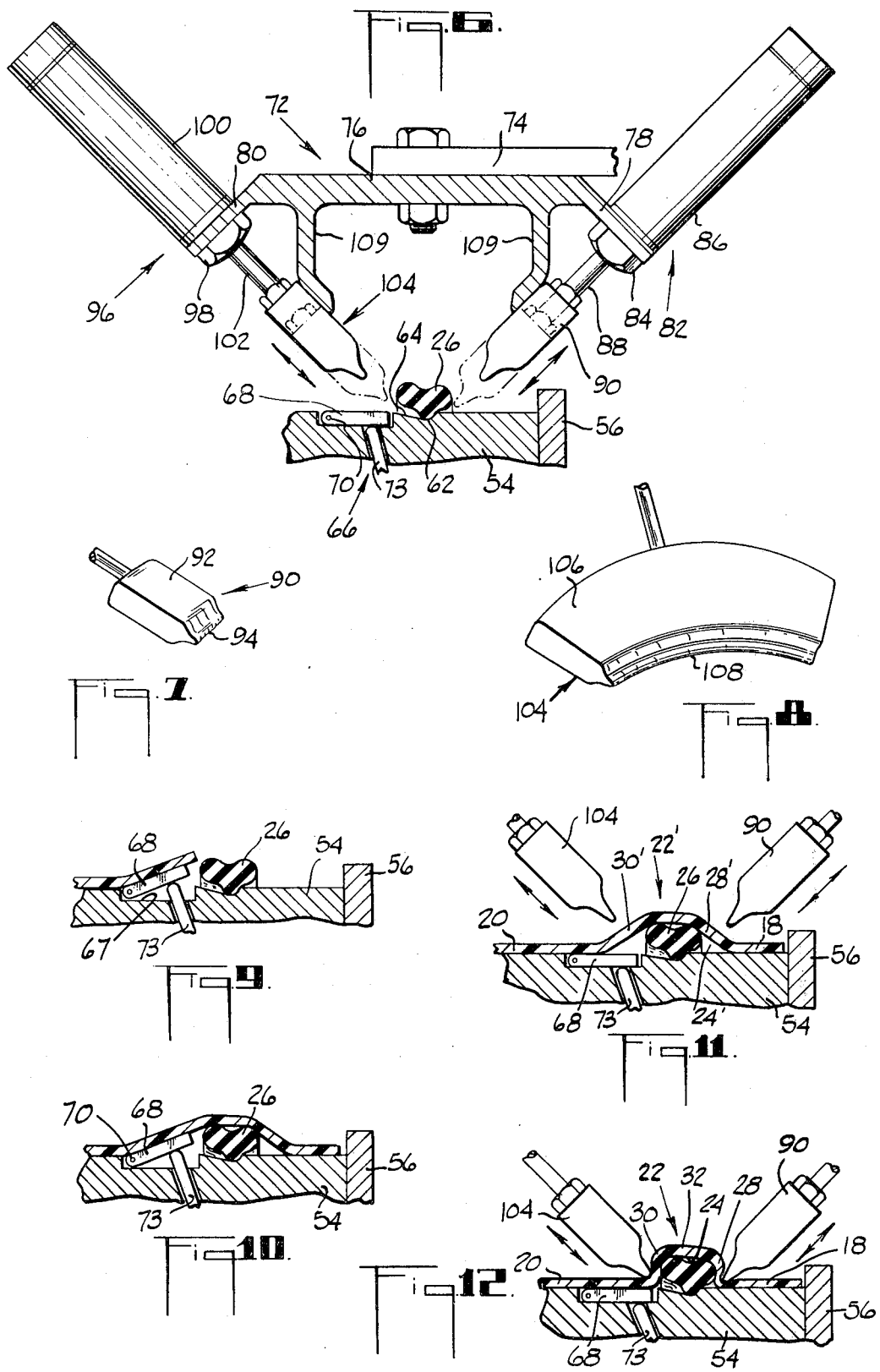

BELL END OF BELL AND SPIGOT JOINT AND METHOD AND ASSEMBLY

RELATED APPLICATIONS

This application is a continuation-in-part of U.S. Ser. No. 408,771, filed Oct. 23, 1973 now abandoned.

BACKGROUND OF THE INVENTION

1. Field of the Invention

The present invention is directed generally to the formation of the female member of a pipe joint and more particularly to the formation of the bell end of a bell and spigot pipe.

2. Description of Prior Art

Heretofore, there have been many suggested methods of seal connecting together two pipes. One such method utilizes a bell and spigot joint which includes a female counterpart member, commonly referred to as the bell end, having an enlarged sleeve defining an inner-circumferential groove. A circumferential sealing gasket is provided within the groove so that the male counterpart member of the joint, commonly referred to as the spigot, can be inserted into the bell end such that the gasket provides a seal therebetween.

In a known method of forming the aforedescribed bell end from an end section of a heat deformable pipe, a longitudinally extending core supporting a circumferential sealing gasket around its outer periphery is provided. The end section of the heat deformable pipe is heated to its range of thermoelastic deformability and, by relative movement, is moved over the core and gasket to a predetermined position. During this movement, the heated end section is deformed so that, when it reaches the predetermined position, it includes an inner-circumferential groove within which the sealing gasket is located.

The aforedescribed method is one which has often been used heretofore with various degrees of success. However, there is one major drawback which has heretofore resulted in using this particular method. Briefly, because the heated end section of the pipe is formed over the core and gasket or other such groove forming means, the longitudinal extent of the inner-circumferential groove, at any point along its circumference, tends to increase from the groove's outermost periphery to its innermost periphery. In other words, those surfaces which lie on opposite sides of the gasket and which define the longitudinal extent of the groove tend to taper inwardly and away from one another. These surfaces provide only limited resistance to gasket displacement during either assembly of the bell end from the aforesaid core after formation of the bell end.

The aforedescribed drawback tends to exist where the heated pipe end is formed around only a gasket, as illustrated in U.S. patent application Ser. No. 240,401, filed Apr. 3, 1972, now U.S. Pat. No. 3,793,427 dated Feb. 19, 1974, and is only eliminated when using a gasket in combination with gasket retaining elements, as illustrated in U.S. patent application Ser. No. 240,080, filed Mar. 31, 1972, now U.S. Pat. No. 3,807,027 dated Apr. 30, 1974, both of the patents being assigned to the assignee of the present application. It is believed that the use of internal suction or external air pressure to aid in forming the bell end does not completely remove the particular drawback discussed above.

BRIEF SUMMARY OF THE INVENTION

An object of the present invention is to provide, as part of the pipe joint, a female member including a inner-circumferential groove having a particular configuration which reliably provides resistance to displacement of a circumferential sealing gasket located in the groove.

Another object of the present invention is to provide the last-mentioned groove with a particular configuration which reliably locks the gasket within the groove.

Still another object of the present invention is to provide a method and assembly for forming the aforestated inner-circumferential groove in a heat deformable pipe section.

These and other objects and features of the present invention are achieved in a manner which will become apparent upon a reading of the detailed description. Briefly, in accordance with a preferred embodiment of the present invention, the aforedescribed female member, for example a bell end, is formed by first providing a core section having a predetermined outer surface configuration and placing circumferential groove forming means, for example a sealing gasket, around the core section such that at least a portion of the gasket extends outwardly from the outer surface configuration of the core section.

A heat deformable pipe section is heated to its range of thermoelastic deformability and, by relative movement, is moved over the core section and gasket to a predetermined position. During this movement, the heated pipe section initially deforms so that, when it reaches the predetermined position, it includes an inner surface similar in configuration to the outer surface configuration of the core section and a inner-circumferential groove within which at least a portion of the gasket is located. The longitudinal extent of the groove is defined by longitudinally spaced circumferential surfaces located in the pipe section and extending outwardly from the pipe section's inner surface on opposite sides of the gasket.

In accordance with the present invention, while the pipe section is still in a heat deformable state, it is further deformed by physical engagement with at least one deforming member so as to decrease the longitudinal distance between at least one pair of longitudinally aligned points. These selected points are actually surface segments of those surfaces defining the longitudinal extent of the groove. Decreasing the longitudinal distance between these selected points results in improved resistance to gasket displacement, especially during assembly of the pipe joint. In an actual working embodiment, the heated pipe section is deformed by a member of deforming members in a way which will lock the gasket within the groove.

BRIEF DESCRIPTION OF THE DRAWINGS

FIG. 1 is a frontal cross-sectional view of the bell end of a bell and spigot joint formed in accordance with the present invention.

FIG. 2 is a cross-sectional view of the bell end illustrated in FIG. 1, taken along line 2—2 in FIG. 1, however, with the gasket removed from the bell end so as to illustrate particular details of the inner-circumferential groove within which the gasket is located.

FIG. 3 is a cross-sectional view of the bell end in FIG. 1 taken generally along line 3—3 in FIG. 1.

FIG. 4 is an enlarged view in partial frontal section of the bell end of FIG. 1, illustrating the inner-circumferential groove.

FIG. 5 is a partial frontal and partial frontal cross-sectional view of an assembly which is constructed in accordance with the present invention and which is used in forming the bell end illustrated in FIG. 1.

FIG. 6 is a frontal sectional view of a portion of the assembly of FIG. 5 and illustrating a particular aspect thereof.

FIG. 7 is a perspective view of a groove deforming member used in the assembly of FIG. 5.

FIG. 8 is a perspective view of another groove deforming member used in the assembly of FIG. 5.

FIGS. 9–12 are partial frontal sectional views of a portion of the assembly of FIG. 2 illustrating the formation of the bell end.

DETAILED DESCRIPTION AND PREFERRED EMBODIMENTS

Figure 14:
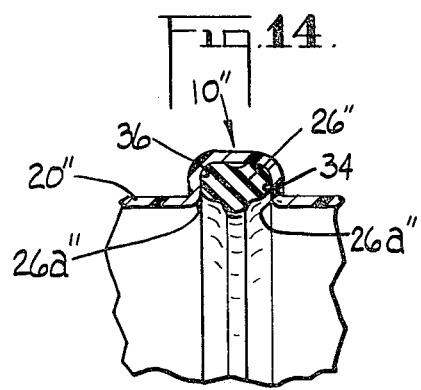
FIG. 14 is a view in partial frontal section of a portion of a bell end modified from that shown in FIG. 1.

Turning now to the drawings, wherein like components are designated by like reference numerals throughout the various figures, the bell end 10 of a bell and spigot joint, formed in accordance with the present invention, is shown in FIG. 1. Bell end 10 is formed from one end section of a pipe constructed of a heat deformable material such as, for example, polyvinyl choloride, and includes an enlarged bell-shaped sleeve 12 which tapers inwardly at 14 and merges with the undeformed section 16 of the pipe. The inner diameter of sleeve 12 is preferably slightly greater than the outer diameter of undeformed section 16. Hence, the sleeve is adapted to receive the male counterpart member, i.e., spigot (not shown), of the bell and spigot joint in a co-axial fashion, the spigot having an outside diameter equal to that of the undeformed pipe section. In this regard, while the heat deformable pipe and therefore the enlarged sleeve will be described and illustrated as having a circular cross section, it is to be understood that other cross-sectional configurations are contemplated.

As illustrated best in FIG. 1, the enlarged sleeve 12 may be separated into three sections, a forward cylindrical section 18, a rearward substantially identical cylindrical section 20 longitudinally spaced from and co-axial with the forward section and an intermediate section 22 integrally joining the forward and rearward sections. It should be apparent from FIG. 1 that intermediate section 22 defines an inner-circumferential groove 24 which is co-axial with sections 18 and 20 of the enlarged sleeve. An annular sealing gasket 26 constructed of, for example, hard rubber, is located within and substantially fills the groove and extends inwardly a substantial distance beyond the inner surface of the sleeve. In this manner, the gasket provides a reliable seal between the spigot and bell end of the bell and spigot joint.

In providing groove 24, intermediate section 22 of enlarged sleeve 12 includes opposite longitudinally spaced circumferential side walls 28 and 30 which extend outwardly from adjacent ends of sections 18 and 20 respectively and which are integrally joined together by a circumferential outer wall 32. As noted best in FIG. 4, the inner-circumferential surfaces 34 and 36 of respective side walls 28 and 30 extend outwardly from the innermost periphery 37 of groove 24 to the outermost periphery of the groove, i.e., outer wall 32, and define the longitudinal extent of the groove.

In accordance with the present invention, groove 24 has a configuration which minimizes gasket displacement from the groove during either assembly or disassembly of bell end 10 and its associated spigot. In fact, in a preferred embodiment, the configuration of groove 24 is such that the gasket is locked therein. In this regard, it should be noted that inner surface 36 is substantially flat and extends outwardly from the innermost periphery of the groove in a plane substantially perpendicular to the axis of sections 18 and 20. On the other hand, it should be noted that the inner-circumferential surface 34 of side wall 28 includes surface segments 42 which extend into the groove 24 a greater distance than the rest of surface 34. This is a preferred embodiment of groove 24. These segments which are preferably located at the innermost periphery 37 of the groove are preferably discrete segments circumferentially spaced around the groove, but may comprise one continuous segment, as will be discussed hereinafter.

From the foregoing, it should be apparent that the longitudinal distance between discrete surface segments 42 of inner surface 34 and longitudinally aligned segments of surface 36 is less than the distance between any other longitudinally aligned points on surfaces 34 and 36. In other words, the longitudinal extent of groove 24 is at a minimum along its innermost periphery, at least between these aligned segments. As illustrated best in FIG. 1, a portion of sealing gasket 26 is located within groove 24 outwardly of surface segments 42 while a portion of the gasket extends into enlarged sleeve 12 beyond the innermost periphery of the groove. It should be noted that the maximum longitudinal extent of that portion of the sealing gasket located outwardly of segments 42 is greater than the longitudinal distance between surface 36 and segments 42. Hence, these segments prevent easy removal of the gasket from groove 24 and, in fact, lock the gasket in place.

It should be apparent from the foregoing description of bell end 10 that circumferential surface 36 of the side wall 30 preferably does not include discrete surface segments similar to surface segments 42 in surface 34. It should also be apparent that surface 36 is located on the pressure side of the gasket 26 when the bell end is used as part of a pressure pipe joint. One reason for not providing these discrete segments in surface 36 is that the wall thickness at each of these segments is decreased by the very formation of the segment, as will be seen hereinafter. If a high degree of pressure is exerted against these points, it could possibly cause permanent damage. This is not likely to occur on the forward or zero pressure side of the gasket. Where the bell end is not used in pressure pipe but rather in non-pressure pipe such as, for example, sewer pipe or telephone duct, segments similar to segments 42 could also be provided as a part of surface 36 without any detrimental results. In fact, this could also be done in pressure pipe if the bell end had sufficient wall thickness or the joint was found generally to be capable of including segments on both sides of the groove. The distance in which segments 42 protrude into groove 24 from the rest of surface 34 will depend on several factors such as the wall thickness of the pipe section prior to forming the segments and the distance required to lock the gasket within the groove. The distance could be readily determined in view of the present disclosure. In this regard, while the segments 42 are separate discrete segments spaced apart from one another, one continuous segment could be provided so long as the bell end remains mechanically sound and there is little possibility of cracking or other such permanent damage at the continuous segment. In addition, while segments 42 have been illustrated as lying along the innermost periphery of groove 24, they could be located outwardly therefrom under certain circumstances as will be seen below.

As noted in FIG. 1, sealing gasket 26 is of a particular configuration. It is to be understood that the gasket is not necessarily limited to this configuration but may display various other configurations. For example, the gasket may be an O-ring. In any event, the maximum longitudinal extent of that portion of the gasket which is located outwardly of segments 42 should be at least equal to but preferably greater than the longitudinal extent between the segments and surface 36. This should be the case whether the segments lie at the innermost periphery of the groove as illustrated or outwardly therefrom. In addition, segment 42 could extend into the groove a sufficient distance to engage against and deform the gasket, resistance to gasket displacement thereby increasing.

Turning to FIG. 5, attention is directed to an assembly 44 which is constructed in accordance with the present invention and which is preferably utilized in the formation of bell end 10 or similar bell ends designed to resist gasket displacement. As will be described in more detail hereinafter, assembly 44 includes a mandrel or core arrangement 46 which is provided for initially deforming a heated end section of a heat deformable plastic pipe so that the end section takes the general shape of bell end 10, with the exception of the particular configuration of inner-circumferential groove 24. Assembly 44 also includes a groove deforming arrangement 48 which, after formation of the bell end around the core arrangement, further deforms the bell end and in so doing changes the configuration of groove 24, preferably to provide one of the aforediscussed configurations.

As illustrated best in FIG. 5, mandrel arrangement 46, which is preferably constructed of a rigid surface material such as steel, includes a first cylindrical core section 50 which tapers outwardly at 52 and merges with a second enlarged cylindrical core section 54. A circumferential stop element 56 in the form of an annular flange or other such means may be provided at the free end of core section 54, the stop element extending radially outwardly from the core section. In addition, the free end of core section 50 may be connected with a further section 58 which includes a beveled surface 60 tapering radially inwardly and away from the core section 50. The mandrel assembly is preferably supported in a horizontal direction by suitable means (not shown).

As illustrated best in FIG. 6, enlarged core section 54 includes an annular recess 62 which is adapted to receive the radially inward surface of sealing gasket 26 and an annular ramped surface 64 tapering outwardly and away from recess 62 in the direction of core section 50. The particular purposes for using annular recess 62 and ramped surface 64 are disclosed in detail in the above-mentioned Patent Application Serial No. 240,080, reference being made thereto. However, briefly, the annular recess allows for greater sealing capabilities of the gasket when it is ultimately formed within groove 24 of the bell end and ramped surface 64 aids in removing the gasket from the recess after formation of the bell end about the core sections, as will be seen hereinafter.

As seen in FIGS. 5 and 6, enlarged core section 54 also includes a retractable ramp arrangement 66 which is located between ramped surface 64 and the taper 52 (see FIG. 5). This arrangement, the way it functions and the advantages attained are specifically disclosed in the above-mentioned Patent Application Serial No. 240,401, reference being made thereto. Briefly, however, it should be noted that arrangement 66 includes a plurality of axially extending and equally circumferentially spaced open slots 67 (see FIGS. 9 and 10) extending between the ramped surface 64 and taper 52. Each of these slots receives a close fitting ramp bar 68 which is pivotally connected by, for example, a pivot pin 70, at one end near the end of core section 54 adjacent taper 52. The ramp bars are movable between a first retracted position, as illustrated in FIGS. 11 and 12, and a second ramped position, as illustrated in FIGS. 9 and 10.

The ramp bars, when in the retracted position, extend parallel with the axis of core section 54 and flush with the outer surface thereof. However, when the ramp bars are in their respective ramped positions, they extent outward at equal angles with respect to the axis of core section 54 so as to create an effective annular ramped surface leading upward in the direction of recess 62. The ramp bars may be biased in their retracted positions by, for example, biasing springs (not shown), or other suitable means. As illustrated best in FIGS. 9–12, the pivot connected ends of the ramp bars are preferably rounded which, as will become apparent hereinafter, is to facilitate movement of the heated end section of a heat deformable pipe up the ramped surface.

As stated above, the ramp bars are biased in their respective retracted positions. In this regard, any suitable means may be provided for moving the bars from this position to their respective extended positions. One specific way in which this is accomplished is illustrated in detail in the lastmentioned patent application. However, in that case, the ramp bars are open to the interior of the core section and can directly engage against a movable inclined surface, as fully disclosed in the application. The same procedure could readily be followed herein if ramp bars 68 are completely open to the interior of core section 54. However, as illustrated, they are not completely open to the interior or core section 54. Hence, movable inclined surface 71, similar in operation to the one disclosed in the lastmentioned application, is connected with the ramp bars by connecting rods 73 slidable within cooperating passages 75.

A conventional suction device (not shown) may be provided for producing a low pressure atmosphere within the core sections 50 and 54 which may include a plurality of circumferentially and longitudinally spaced air passages (not shown). In this manner, as will be seen hereinafter, inwardly directed section forces are produced around the core sections for aiding in the formation of bell end 10 around the core sections. Conventional sealing means such as O-rings (not shown) may be provided around the core sections and suitable positioned so as to enable production of the suction forces. Externally applied air pressure may also be provided for the same reasons.

Having described mandrel or core arrangement 44, attention is now directed to groove deforming arrangement 48. As illustrated best in FIG. 5, this arrangement includes an annular support 72 which is co-axially supported around mandrel arrangement 46 by any suitable means such as, for example, brackets 74 suitably connected to the support and mandrel arrangement. As best seen in FIG. 6, the support includes an intermediate straight section 76 concentrically circumscribing core section 54 of the mandrel arrangement directly outwardly of annular recess 62. The support also includes end sections 78 and 80 which are connected, preferably integrally so, to opposite ends of section 76 and which extend radially inwardly and away from these ends, preferably at approximately 45° with the axis of section 76. However, the present invention is, of course, not limited to this angle.

Support section 78 is provided for supporting a plurality of circumferentially spaced piston and cylinder units 82, one of which is shown in FIG. 6. Each of these units, which is supported to section 78, by any suitable means such as a nut 84, includes a cylinder 86 located externally of the support section and a piston 88 located internally of the support section and extending in a direction perpendicular thereto. A groove deforming member 90 is suitably connected at one end to the free end of piston 88 and, as best seen in FIG. 7, preferably includes a body portion 92 and a reduced somewhat rounded free end 94.

The intermediate straight section of support 72 has been shown as a continuous straight section. It could and preferably is separated into two sections, one joining end section 78 and the other joining end section 80. In addition, suitable means (not shown) could and would be provided for supporting the two separate sections (and their associated end sections) for adjustable movement towards and away from one another in the axial direction. In this way, groove forming member 90 supported at end section 78 and a groove forming member (to be discussed below) supported at end section 80 could be adjusted axially. In addition, the angled end section 78 and 80, while not shown, could include suitable means for allowing them to be angularly adjustable.

Piston and cylinder units 82 may be actuated in any suitable manner. For example, they may be actuated electrically, hydraulically or pneumatically. In any event, the pistons 88 and their respective groove deforming members 90 are movable between a retracted position, as illustrated by solid lines in FIG. 6, and an extended position, as illustrated by dotted lines. With the groove deforming members in their respective retracted positions, their corresponding ends 94 preferably lie on a common circle radially outwardly of core section 54 and to one side of annular recess 62. With the groove deforming members in their respective extending positions, ends 94 also preferably lie on a common circle radially outwardly of core section 54 and to one side of annular recess 62 but closer to both then when they are in the retracted position. In this regard, the groove deforming members preferably move in respective paths which, if extended, would intersect the axis of core section 54 at an acute angle, for example 45°. In addition, the piston and cylinder units are preferably equally circumferentially spaced around support section 78.

Support section 80, like support section 78, supports a plurality of circumferentially spaced piston and cylinder units 96, one of which is shown in FIG. 6. Each of the units 96, which is preferably identical to a piston and cylinder unit 82, is supported to support section 80 by suitable means such as nut 98 and includes an externally located cylinder 100 and an internally located piston 102 which extends perpendicular to the support section. Each of the units 96 includes a groove deforming member 104 which is suitably connected to the free end of its piston 102. As best seen in FIG. 8, groove deforming member 104 is preferably similar in cross section to groove deforming member 90 and therefore includes in cross section a body portion 106 and a reduced somewhat rounded free end 108. However, in accordance with a preferred embodiment, the groove deforming member 104 defines an arcuate path, preferably a segment of a circle, between its opposite sides. The groove deforming members 104, like groove deforming members 90, are movable between the retracted position, as illustrated by solid lines in FIG. 6 and an extended position, as illustrated by dotted lines.

With groove deforming members 104 in their respective retracted positions, ends 108 preferably lie on a common circle radially outwardly of core section 54 and to one side of annular recess 62 opposite groove deforming members 90. With the groove deforming members 104 in their respective extended positions, the ends 108 also preferably lie on a common circle closer to but also spaced from core section 54 and recess 62. In this regard, each of the deforming members 104, like members 90, preferably moved along a path which, if extended, would intersect the axis of core section 54 at an acute angle, for example 45°.

The piston and cylinder units 96 and their associated groove deforming members are preferably equally circumferentially spaced around support section 80 of support 72. In addition, there are preferably a sufficient number of these units such that, when groove deforming members 104 are in their respective extended position, they form a continuous ring around the core section 54.

Suitable means (not shown) are provided for actuating piston and cylinder units 82 and 96, preferably simultaneously. These means preferably automatically actuate the units at the appropriate time during formation of bell end 10. In addition, support 72 may be provided with suitable guides such as guides 109 which slidably contact members 90 and 104 during movement of these members.

As described above, the groove forming members are moved by piston and cylinder units. It is to be understood, however, that the members may be moved in other ways. For example, they may be moved mechanically by a suitable mechanical linkage arrangement.

With assembly 44 constructed in the aforedescribed manner, attention is now directed to a method of forming bell end 10 in accordance with a preferred embodiment of the present invention. As illustrated in FIG. 9, a sealing gasket 26 or any other suitably shaped gasket is positioned around core section 54 and within annular recess 62 such that a portion of the gasket extends outwardly from the external surface of the core section and such that a portion extends inwardly therefrom. If desired or necessary, the core section may be suitable lubricated and/or heated to reduce friction. The ramp bars 68 are held in their respective ramped positions.

After the end section of an appropriately dimensioned heat deformable pipe has been heated to its range of thermoelastic deformability, which can be provided in any suitable way, the free end of the heated pipe section is positioned concentrically around the free end of core section 50, preferably aided by tapered surface 60 of section 58. The end section is then moved forward up taper 52, over the rounded edges of the ramp bars 68 and up the bars, as also illustrated in FIG. 9. This, of course, causes the end section to deform outwardly and over gasket 26. As forward movement is continued, the free end of the heated end section moves past the gasket and deforms inwardly onto the surface of core section 54 until it is against stop 56, as illustrated in FIG. 10. The ramp bars are then moved back to their retracted axially parallel positions, as seen in FIG. 11. At this time, internal suction and/or externally applied and radially inwardly directed air pressure (not shown) may be applied to the core sections 50 and 54.

It should be readily apparent from the foregoing that as the heated end section moves toward stop 56 it is deformed and that after it reaches the stop it is closely contoured around core section 50, taper 52 and core section 54 on opposite sides of the gasket, thereby providing sections 14 and 16 of bell end 10 and sections 18 and 20 of enlarged sleeve 12. However, it should be noted that the sections corresponding to section 22 of enlarged sleeve 12 (section 22' for illustration) is only generally formed around gasket 26. More specifically, as best seen in FIG. 11, the circumferential side walls 28' and 30' of this section taper inwardly and away from the gasket 26 such that the inner-circumferential groove within which the gasket sits has a substantially greater longitudinal extent at its inner periphery than the longitudinal extent of the gasket itself. In accordance with the present invention, the side walls 28' and 30' as shown in FIG. 11 are deformed while still in a heat deformable state so that the innercircumferential groove ultimately has one of the configurations described with respect to FIGS. 1–4. This is accomplished by means of groove deforming arrangement 48 as will be seen below.

With the heated end section positioned around core section 54 and gasket 26 in the manner illustrated in FIG. 11, it should be noted that the groove deforming members 90 and 104 are in their respective retracted positions spaced from initially formed side walls 28' and 30'. At this point, the groove deforming members are moved, preferably simultaneously, to their respective extended positions. During this movement, the ends of members 90 and 104 respectively engage against side walls 28' and 30' causing the side walls or at least segments of the side walls to deform towards each other. When the groove deforming members reach their respective extended positions, as best illustrated in FIG. 12, the side walls 28 and 30, as described in FIGS. 1–4 are provided. In other words, groove deforming members 90 and 104 are responsible for providing previously described surfaces 34 and 36 of side walls 28 and 30 and surface segments 42.

It should, of course, be noted that the groove deforming members must be appropriately positioned relative to mandrel arrangement 46 to accomplish the foregoing. In addition, it should also be noted that the groove deforming members can be appropriately arranged and chosen to provide the particular groove configuration illustrated in FIGS. 1–4 or they may be appropriately positioned and chosen to provide various other configurations contemplated by the present invention. For example, the groove deforming members 104 could be identical to the groove deforming members 90 to provide identical surface segments 42 on opposite sides of the gasket. In this regard, the groove deforming members could be longitudinally aligned with one another so that surface segments 42 on opposite sides of the gasket are longitudinally aligned with one another or the groove deforming members could be staggered so that the surface segments on opposite sides of the gasket are staggered. Moreover, groove deforming members 90 could be made identical to groove deforming members 104 so that the ultimately formed surface 34 of side wall 28 is identical to surface 36 of side wall 30. Other configurations are possible. However, it should be kept in mind that the ultimate purpose of utilizing groove deforming arrangement 48 is to alter the configuration of the inner-circumferential groove to increase resistance to gasket displacement and preferably to lock the gasket within the groove. In this regard, the number of deforming members used will depend upon the particular groove configuration desired.

After the side walls 28 and 30 have been formed by groove deforming members 90 and 104, the groove deforming members are moved to their retracted positions. The newly formed bell end is allowed to cool to a temperature below the range of thermoelastic deformability by, for example, a prolonged exposure to ambient temperature or by application of a cooling fluid thereto. In this regard, deforming members 90 and 104 are preferably maintained in the extended position at least throughout partial cooling of the bell end. Once, bell end 10 has been sufficiently cooled, it is separated from the mandrel arrangement with gasket 26 remaining disposed within inner-circumferential groove 24. During initial separation, the gasket moves up ramped surface 64 deforming radially outwardly and thereby easily moves out of recess 62. In this regard, gasket 26 is preferably the gasket which will be ultimately used with the bell end and hence preferably remains within groove 24. It is to be understood, however, that this does not necessarily have to be the case. In addition, more than one gasket may be provided and a gasket or gaskets may be provided in combination with one or more gasket retaining elements which are of suitable configuration so as not to frustrate the the objectives of the present invention.

The heated end section of the heat deformable pipe may be positioned around the mandrel arrangement and separated therefrom after formation of bell end 10 by conventional means such as an apparatus illustrated and described in the U.S. Pat. No. 3,520,047 issued to Muhlner et al. on July 14, 1970. In this regard, while the heated end section was described as moving onto and over the core sections of arrangement 46, it should be readily apparent that the core sections could be moved into the heated end section or both the mandrel assembly and end section could be moved simultaneously.

Figure 13:
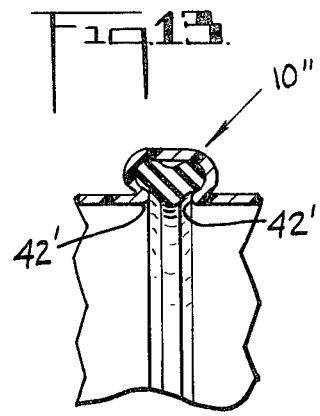
FIG. 13 is a view in partial frontal section of a portion of a bell end modified from that shown in FIG. 1.

As specifically shown in FIGS. 1–4 and 12, the surface 34 of groove 24 includes inwardly projecting segments 42 while the entire surface 36 is flat, lying in a plane perpendicular to the inner surfaces of section 20, (see FIG. 1). However, as stated previously, (1) surface 34 could be identical to surface 36, i.e., entirely flat, (2) surface 36 could be identical to surface 34, i.e., including segments 42 and (3) the segments 42, on one or both of the surfaces 34 and 36, could be discontinuous as shown or they could form a continuous circle. FIG. 13 illustrates a bell end 10, made in accordance with the present invention and identical to bell end 10 except that segments 42 are replaced with a continuous circular segment 42' on each side of the groove. FIG. 14 illustrates a bell end 10" made in accordance with the present invention and identical with bell end 10, with the following exceptions. First, both surfaces 34" and 36" are flat (identical to surface 36). Second, while not absolutely necessary, the gasket 26" has opposite sides 26a" which when undeformed are flat, extending perpendicular to the internal surfaces of section 20". These surfaces 34" and 36" are preferably formed (in the manner set forth above) so that the longitudinal distance therebetween is slightly less than the longitudinal distance between sides 26a" when gasket 26" is in an undeformed state. In this way, surfaces 34" and 36" hug against and squeeze the gasket to hold it in place within the groove. This was discussed previously with respect to bell end 10.

What we claim is:

1. An assembly for use in forming a bell end having an inner-circumferential groove in a heat deformable pipe section heated to its range of thermoelastic deformability said assembly comprising:
   a. a core section having a longitudinally extending axis, a predetermined outer surface configuration and being adapted to support a circumferential sealing gasket around an annular portion of said core section, said gasket extending outwardly from said outer surface configuration;
   b. said core section and gasket being adapted for insertion to a predetermined point within said heated pipe section by relative movement between said pipe section and said core section and gasket whereby to deform said pipe section to include:
      i. an inner surface similar in configuration to the outer surface configuration of said core section, and
      ii. an inner-circumferential groove within which said gasket is located, the longitudinal extent of said groove being defined by longitudinally spaced circumferential surfaces located on said pipe section and extending outwardly from said inner surface of said pipe section on opposite sides of said gasket and
   c. first and second deforming means located outwardly of an adjacent said core section on opposite sides of said annular portion of said core section and movable along straight line paths extending toward said annular portion at acute angles with the axis of said core section between first positions spaced from said heated pipe section after formation of said groove and second positions so that, in said second positions, each of said deforming means is adapted to engage against said pipe section and decrease the longitudinal distance between at least one pair of longitudinally aligned surface segments along said outwardly extending surfaces defining said groove.

2. An assembly according to claim 1 wherein said angle is approximately 45°.

3. An assembly for use in the formation of the female member of a pipe joint, comprising:
   a. a cylindrical core section adapted to support at least one annular sealing gasket about an annular portion of its outer periphery;
   b. a plurality of first pipe deforming members having corresponding ends, each end of which is movable between a first position and a second position;
   c. means for supporting said deforming members in circumferentially spaced relationship with one another around said core section such that
      i. each of said corresponding ends when in said first position, is a predetermined distance from said portion of said core section, and when in said second position, is closer to but spaced from said portion of said core section
      ii. said corresponding ends, when in said second position, are spaced apart and lie on a common circle concentric with and circumscribing said core section, and
      iii. said corresponding ends are movable between said first and second positions along respective paths, each of which, if extended, would intersect the axis of said core section at an acute angle;
   d. a plurality of second pipe deforming members having corresponding end, each end of which is movable between a first portion and a second position;
   e. means for supporting said plurality of second deforming members in circumferentially spaced relationship with one another around said core section on the opposite side of said portion of said core section such that
      i. each of said second deforming members is longitudinally spaced from said first deforming members,
      ii. each of the corresponding ends of said second members, when in said first position, is a predetermined distance from said portion of said core section and, when in said second position, is closer to but spaced from said portion of said core section,
      iii. said corresponding ends of second members, when in said second position are adjacent each other, lie on a second common circle concentric with and circumscribing said core section, said second common circle being longitudinally spaced from said firstmentioned common circle, and
      iv. said corresponding ends of said second members are movable between said first and second positions along respective paths, each of which, if extended, would intersect the axis of said core section at an acute angle; and
   f. means connected to said forming members for moving each of said forming members between the first and second position.

4. An assembly for use in the formation of the female member of a pipe joint, comprising:
   a. a cylindrical core section including
      i. an annular recess extending around the outer surface of said section in a plane normal to the axis of said section, said recess being adapted to support the inner annular portion of an annular sealing gasket therein, said recess including an annular ramped surface defining one annular side of said recess,
      ii. a movable ramped surface located to one side of said recess adjacent said annular ramped surface, said movable ramped surface being movable between a first non-ramped position and a second ramped position such that the movable surface tapers outwardly toward said fixed ramped surface, and
      iii. means for moving said movable surface between said non-ramped position and said ramped position;

b. a plurality of first pipe deforming members having corresponding ends, each end of which is movable between a first position and a second position;
c. means for supporting said deforming members in circumferentially spaced relationship with one another around said core section such that
  i. each of said corresponding ends when in said first position, is a predetermined distance from said core section, and when in said second position, is closer to but spaced from said core section
  ii. said corresponding ends, when in said second position, are spaced apart and lie on a common circle concentric with and circumscribing said core section, and
  iii. said corresponding ends are movable between said first and second positions along respective paths, each of which, if extended, would intersect the axis of said core section at an acute angle;
d. a plurality of second pipe deforming members having corresponding end, each end of which is movable between a first portion and a second position;
e. means for supporting said plurality of second deforming members in circumferentially spaced relationship with one another around said core section such that
  i. each of said second deforming members is longitudinally spaced from said first deforming members,
  ii. each of the corresponding ends of said second members, when in said first position, is a predetermined distance from said core section and, when in said second position, is closer to but spaced from said core section,
  iii. said corresponding ends of second members, when in said second position are adjacent each other, lie on a second common circle concentric with and circumscribing said core section, said second common circle being longitudinally spaced from said firstmentioned common circle, and
  iv. said corresponding ends of said second members are movable between said first and second positions along respective paths, each of which, if extended, would intersect the axis of said core section at an acute angle; and
f. means connected to said forming members for moving each of said forming members between the first and second positions.

5. An assembly according to claim 4 wherein said acute angle is approximately 45°.

* * * * *